US011195210B2

(12) United States Patent
Batkin et al.

(10) Patent No.: US 11,195,210 B2
(45) Date of Patent: Dec. 7, 2021

(54) TECHNOLOGIES FOR CONTENT PRESENTATION

(71) Applicant: Duration Media LLC, La Quinta, CA (US)

(72) Inventors: Andy Batkin, La Quinta, CA (US); Gary Herman, Stuart, FL (US); Michael Hannon, Oceanport, NJ (US)

(73) Assignee: Duration Media LLC, La Quinta, CA (US)

( * ) Notice: Subject to any disclaimer, the term of this patent is extended or adjusted under 35 U.S.C. 154(b) by 0 days.

(21) Appl. No.: 16/987,269

(22) Filed: Aug. 6, 2020

(65) Prior Publication Data
US 2021/0042795 A1 Feb. 11, 2021

Related U.S. Application Data

(60) Provisional application No. 62/497,324, filed on Aug. 6, 2019.

(51) Int. Cl.
*G06Q 30/02* (2012.01)
*H04L 29/08* (2006.01)

(52) U.S. Cl.
CPC ..... *G06Q 30/0275* (2013.01); *G06Q 30/0277* (2013.01); *H04L 67/32* (2013.01)

(58) Field of Classification Search
USPC ...................................... 705/14.1
See application file for complete search history.

(56) References Cited

U.S. PATENT DOCUMENTS

| 5,572,643 | A | 11/1996 | Judson |
| 5,675,510 | A | 10/1997 | Coffey et al. |
| 5,708,780 | A | 1/1998 | Levergood et al. |
| 5,710,883 | A | 1/1998 | Hong et al. |
| 5,717,860 | A | 2/1998 | Graber et al. |
| 5,732,218 | A | 3/1998 | Bland et al. |

(Continued)

FOREIGN PATENT DOCUMENTS

| CN | 1378674 A | 11/2002 |
| JP | 2000151925 A | 5/2000 |

(Continued)

OTHER PUBLICATIONS

International Search Report and Written Opinion dated Nov. 16, 2020 for International Application PCT/US20/45284 filed Aug. 5, 2020 (9 pages).

*Primary Examiner* — Afaf Osman Bilal Ahmed
(74) *Attorney, Agent, or Firm* — Dentons US LLP (57) ABSTRACT

In a method a web page hosting a tag script has a first area and a second area smaller than the first area. The first area contains a third area smaller than the first area. The third area is not positioned within the second area when the web page is loaded, and the third area contains a first ad content sourced from a first real-time ad bidding auction. Determining in real time via the tag script (a) whether the first ad content was loaded in the web page for a predefined time period, and (b) based on the other determining whether the third area has been scrolled into the second area as of or after the predefined time period has expired, and requesting a second real-time ad bidding auction for a second ad content to be input into the third area and replace the first ad content.

34 Claims, 3 Drawing Sheets

(56) References Cited

U.S. PATENT DOCUMENTS

| | | |
|---|---|---|
| 5,737,619 A | 4/1998 | Judson |
| 5,740,549 A | 4/1998 | Reilly et al. |
| 5,796,952 A | 8/1998 | Davis et al. |
| 5,838,790 A | 11/1998 | McAuliffe et al. |
| 5,848,396 A | 12/1998 | Gerace |
| 5,937,390 A | 8/1999 | Hyodo |
| 5,960,409 A | 9/1999 | Wexler |
| 5,999,912 A | 12/1999 | Wodarz et al. |
| 6,009,411 A | 12/1999 | Kepecs |
| 6,011,537 A | 1/2000 | Slotznick |
| 6,041,309 A | 3/2000 | Laor |
| 6,081,829 A | 6/2000 | Sidana |
| 6,108,637 A | 8/2000 | Blumenau |
| 6,112,246 A | 8/2000 | Horbal et al. |
| 6,115,680 A | 9/2000 | Coffee et al. |
| 6,119,165 A | 9/2000 | Li et al. |
| 6,138,115 A | 10/2000 | Agrawal et al. |
| 6,141,010 A | 10/2000 | Hoyle |
| 6,167,382 A | 12/2000 | Sparks et al. |
| 6,185,586 B1 | 2/2001 | Judson |
| 6,205,432 B1 | 3/2001 | Gabbard et al. |
| 6,243,865 B1 | 6/2001 | Wei et al. |
| 6,268,856 B1 | 7/2001 | Bruck et al. |
| 6,269,361 B1 | 7/2001 | Davis et al. |
| 6,275,854 B1 | 8/2001 | Himmel et al. |
| 6,279,036 B1 | 8/2001 | Himmel et al. |
| 6,310,601 B1 | 10/2001 | Moore et al. |
| 6,314,451 B1 | 11/2001 | Landsman et al. |
| 6,317,761 B1 | 11/2001 | Landsman et al. |
| 6,317,782 B1 | 11/2001 | Himmel et al. |
| 6,327,619 B1 | 12/2001 | Blumenau |
| 6,347,398 B1 | 2/2002 | Parthasarathy et al. |
| 6,393,407 B1 | 5/2002 | Middleton, III et al. |
| 6,418,470 B2 | 7/2002 | Blumenau |
| 6,449,634 B1 | 9/2002 | Capiel |
| 6,466,967 B2 | 10/2002 | Landsman et al. |
| 6,516,338 B1 | 2/2003 | Landsman et al. |
| 6,553,417 B1 | 4/2003 | Gampper |
| 6,587,837 B1 | 7/2003 | Spagna et al. |
| 6,643,696 B2 | 11/2003 | Davis et al. |
| 6,654,539 B1 | 11/2003 | Duruoz et al. |
| 6,657,647 B1 | 12/2003 | Bright |
| 6,691,281 B1 | 2/2004 | Sorge et al. |
| 6,693,649 B1 | 2/2004 | Lipscomb et al. |
| 6,710,790 B1 | 3/2004 | Fagioli |
| 6,728,753 B1 | 4/2004 | Parasnis et al. |
| 6,763,386 B2 | 7/2004 | Davis et al. |
| 6,789,108 B1 | 9/2004 | McMillan |
| 6,791,579 B2 | 9/2004 | Markel |
| 6,865,719 B1 | 3/2005 | Nicholas, III |
| 6,983,331 B1 | 1/2006 | Mitchell et al. |
| 6,990,630 B2 | 1/2006 | Landsman et al. |
| 7,047,294 B2 | 5/2006 | Johnson et al. |
| 7,120,590 B1 | 10/2006 | Eisen et al. |
| 7,143,075 B1 | 11/2006 | Chickering et al. |
| 7,146,401 B2 | 12/2006 | Hansell et al. |
| 7,155,508 B2 | 12/2006 | Sankuratripati et al. |
| 7,155,663 B2 | 12/2006 | Landsman et al. |
| 7,256,779 B2 | 8/2007 | Donnelly |
| 7,310,609 B2 | 12/2007 | Middleton, III et al. |
| 7,313,590 B2 | 12/2007 | Mentchoukov |
| 7,376,907 B2 | 5/2008 | Santoro et al. |
| 7,576,756 B1 | 8/2009 | Good et al. |
| 7,934,166 B2 | 4/2011 | Clark |
| 7,962,363 B2 | 6/2011 | Patel et al. |
| 7,962,636 B2 | 6/2011 | Stafie et al. |
| 8,356,247 B2 | 1/2013 | Krassner et al. |
| 8,396,745 B2 | 3/2013 | Pen |
| 8,447,651 B1 | 5/2013 | Scholl et al. |
| 9,824,074 B2 | 11/2017 | Krassner et al. |
| 10,380,597 B2 | 8/2019 | Krassner et al. |
| 10,380,602 B2 | 8/2019 | Krassner et al. |
| 2001/0029585 A1 | 10/2001 | Simon et al. |
| 2001/0037232 A1 | 11/2001 | Miller |
| 2001/0047384 A1 | 11/2001 | Croy |
| 2002/0002491 A1 | 1/2002 | Whitfield |
| 2002/0010631 A1 | 1/2002 | Sato et al. |
| 2002/0016736 A1 | 2/2002 | Cannon et al. |
| 2002/0063714 A1 | 5/2002 | Haas et al. |
| 2002/0077891 A1 | 6/2002 | Castle et al. |
| 2002/0099660 A1 | 7/2002 | Lee |
| 2002/0112005 A1 | 8/2002 | Namias |
| 2002/0116494 A1 | 8/2002 | Kocol |
| 2002/0120564 A1 | 8/2002 | Strietzel |
| 2002/0124246 A1 | 9/2002 | Kaminsky et al. |
| 2002/0141584 A1 | 10/2002 | Razdan et al. |
| 2002/0147634 A1 | 10/2002 | Jacoby et al. |
| 2002/0194194 A1 | 12/2002 | Fenton et al. |
| 2003/0004804 A1 | 1/2003 | Landsman et al. |
| 2003/0005000 A1 | 1/2003 | Landsman et al. |
| 2003/0023488 A1 | 1/2003 | Landsman et al. |
| 2003/0023489 A1 | 1/2003 | McGuire et al. |
| 2003/0050833 A1 | 3/2003 | Hamzy et al. |
| 2003/0070182 A1 | 4/2003 | Pierre et al. |
| 2003/0163372 A1 | 8/2003 | Kolsy |
| 2003/0171985 A1 | 9/2003 | Prabhu et al. |
| 2003/0200145 A1 | 10/2003 | Krassner et al. |
| 2004/0030615 A1 | 2/2004 | Ling |
| 2004/0039754 A1 | 2/2004 | Harple |
| 2004/0059683 A1 | 3/2004 | Epstein et al. |
| 2004/0103024 A1 | 5/2004 | Patel et al. |
| 2004/0103426 A1 | 5/2004 | Ludvig et al. |
| 2004/0117259 A1 | 6/2004 | Morrisroe et al. |
| 2004/0143667 A1 | 7/2004 | Jerome |
| 2004/0168184 A1 | 8/2004 | Steenkamp et al. |
| 2004/0186778 A1 | 9/2004 | Margiloff et al. |
| 2004/0205651 A1 | 10/2004 | Dutta et al. |
| 2004/0260767 A1 | 12/2004 | Kedem et al. |
| 2005/0021642 A1 | 1/2005 | Nonaka |
| 2005/0033641 A1 | 2/2005 | Jha et al. |
| 2005/0038900 A1 | 2/2005 | Krassner et al. |
| 2005/0039130 A1 | 2/2005 | Paul |
| 2005/0055277 A1 | 3/2005 | Green et al. |
| 2005/0091160 A1 | 4/2005 | Kitze et al. |
| 2005/0091216 A1 | 4/2005 | Kranz et al. |
| 2005/0108095 A1 | 5/2005 | Perlmutter |
| 2005/0149396 A1 | 7/2005 | Horowitz et al. |
| 2005/0177401 A1 | 8/2005 | Koeppel et al. |
| 2005/0182677 A1 | 8/2005 | Hill |
| 2005/0192871 A1 | 9/2005 | Galuten et al. |
| 2005/0204309 A1 | 9/2005 | Szeto |
| 2005/0289475 A1 | 12/2005 | Martin et al. |
| 2006/0136839 A1 | 6/2006 | Makela |
| 2006/0174199 A1 | 8/2006 | Soltis et al. |
| 2006/0224697 A1 | 10/2006 | Norris |
| 2006/0277481 A1 | 12/2006 | Forstall et al. |
| 2007/0033531 A1 | 2/2007 | Marsh |
| 2007/0118640 A1 | 5/2007 | Subramanian et al. |
| 2007/0130602 A1 | 6/2007 | Gulli et al. |
| 2007/0150353 A1 | 6/2007 | Krassner et al. |
| 2007/0185763 A1 | 8/2007 | Miura et al. |
| 2007/0265923 A1 | 11/2007 | Krassner et al. |
| 2007/0282693 A1 | 12/2007 | Staib et al. |
| 2008/0059571 A1 | 3/2008 | Khoo |
| 2008/0086368 A1 | 4/2008 | Bauman et al. |
| 2008/0306794 A1 | 12/2008 | Cohen et al. |
| 2009/0204485 A1 | 8/2009 | Wills et al. |
| 2009/0265243 A1 | 10/2009 | Karassner et al. |
| 2009/0327869 A1* | 12/2009 | Fan ............... G06Q 30/02 715/240 |
| 2010/0066643 A1 | 3/2010 | King et al. |
| 2010/0088373 A1* | 4/2010 | Pinkham ........... G06Q 30/0257 709/204 |
| 2010/0106715 A1 | 4/2010 | Byun et al. |
| 2010/0153836 A1 | 6/2010 | Krassner et al. |
| 2010/0275221 A1 | 10/2010 | DuVall et al. |
| 2011/0307329 A1 | 12/2011 | Krassner et al. |
| 2013/0185164 A1* | 7/2013 | Pottjegort ............ G06Q 30/02 705/14.73 |
| 2013/0198608 A1 | 8/2013 | Krassner et al. |
| 2015/0154650 A1 | 6/2015 | Umeda |
| 2017/0039242 A1 | 2/2017 | Milton et al. |

(56) References Cited

U.S. PATENT DOCUMENTS

2017/0330245 A1 11/2017 Guermas et al.
2019/0147504 A1 5/2019 Bennett

FOREIGN PATENT DOCUMENTS

| | | | |
|---|---|---|---|
| JP | 2002092475 | A | 3/2002 |
| JP | 2005165651 | A | 6/2005 |
| JP | 2005182364 | A | 7/2005 |
| JP | 2006217654 | A | 8/2006 |
| JP | 2006252179 | A | 9/2006 |
| JP | 2007533019 | A | 11/2007 |
| JP | 2008198171 | A | 8/2008 |
| WO | WO2000073960 | | 12/2000 |
| WO | WO2005081155 | | 10/2007 |
| WO | WO2010071666 | | 6/2010 |

* cited by examiner

TECHNOLOGIES FOR CONTENT PRESENTATION

CROSS REFERENCE TO RELATED APPLICATIONS

This application claims the benefit of U.S. Provisional Application No. 62/497,324 filed 6 Aug. 2019; which is incorporated herein by reference in its entirety for all purposes.

TECHNICAL FIELD

The embodiments relate generally to systems and methods for real-time viewable advertising, and more specifically, to systems and methods that programmatically sell the same ad space on the same computing device multiple times.

BACKGROUND

Real-time bidding allows near instantaneous buying and selling of advertisement spaces online. Typically, buyers of the advertisement space ("ad space") use a demand side platform such as a trading desk, sellers of the ad space use a supply side platform, and these platforms may interact with a third entity called an exchange. The exchange hosts an exchange server that supports real-time bidding. In some instances, the exchange may also subsume the role of the supply side and/or demand side platforms.

On the demand side, the ad buyer (advertiser) seeks to maximize placement and impact of their ad, while on the supply side, the ad space seller (publisher) seeks to reduce the amount of work necessary to place, maintain, track and process payments for placing the ad.

Current methods for supporting buying and selling of ad space generally use hard-coded tags on a webpage that trigger a sale of ad space by the supply side platform as the webpage loads. For example, the supply side platform may alert the exchange of a user and/or webpage where an ad space is available. The exchange server supporting real-time-bidding then begins an auction with one or more demand side platforms and even other exchanges to determine which advertiser gets to publish the ad, e.g., the highest bidder. The exchange server may communicate attributes of the user to the demand side platform, which in turn determines whether the user has the desired attributes that the advertiser wants to target. Based on the perceived value of the user and the ad space, i.e., ad impression, each demand side platform places a bid (based on the advertisers associated therewith). The highest bidding advertiser is determined by the exchange, and the ad is published to the webpage of that user.

A majority of the ads sold, however, are never published, such as those ads "below the fold" (i.e., off the screen) that require the user to scroll down to view the ads. Another portion of ads sold remain viewable for an extended period of time, such as when a user remains stationary on a webpage or only slowly scrolls, and thus provides no additional impact for the advertiser. Nevertheless, under current real-time bidding practices, the advertisers often pay the same amount for an ad regardless of its location on the webpage, or duration of view time.

Clearly, a viewable ad is worth much more to an advertiser than an ad that is not yet in view and may never actually come into view. Moreover, once an ad has been viewed, placement of a different ad may increase the monetization of that ad space for the publisher and expand the pool of desirable high impact ad space available for the advertiser. Exchanges have previously been unable to provide the appropriate context to allow publishers and advertisers to more accurately bid on ad space based on viewability parameters.

Therefore, a need exists for systems and methods for dynamic monitoring of an ad space, placement of ads based on viewability status, i.e., systems and methods that programmatically identify which ad space will become viewable, and resale of ad space, i.e., a second real-time bidding auction.

SUMMARY

The present invention relates to systems and methods for performing a second real-time bidding auction that may source a second ad content to be displayed in an ad slot, i.e., an ad slot that had remained below the fold on a web page loaded into a browser but has been scrolled above the fold and meets specific viewability criterion.

Accordingly, a method of the presently disclosed invention may load, by a processor, a web page in a browser having a viewport, wherein the web page has a first area, wherein the viewport has a second area, wherein the first area is larger than the second area, wherein the web page has a script embedded therein, wherein the first area contains a third area, wherein the first area is larger than the third area, wherein the third area is not positioned within the second area when the web page is loaded, wherein the third area contains a first ad content sourced from a first real-time ad bidding auction.

Further, a first real-time determination, by the processor, of whether the first ad content has been loaded in the web page for a predefined time period while the web page remains loaded in the browser is made, wherein the first real-time determination is via the script while the web page remains loaded in the browser, and a second real-time determination is made, by the processor, of whether the third area has been scrolled into the second area at least one of as of or after the expiration of the predefined time period while the web page remains loaded in the browser, wherein the second real-time determination is via the script while the web page remains loaded in the browser. The second real-time determination is based on the first real-time determination determining that the first ad content has been loaded in the web page for the predefined time period while the web page remains loaded in the browser.

A second real-time ad bidding auction for a second ad content to be input into the third area and replace the first ad content may be made responsive to the third area being scrolled into the second area based on the second real-time determination while the web page remains loaded in the browser, wherein the second real-time ad bidding auction occurs while the web page remains loaded in the browser.

A second ad content sourced from the second real-time ad bidding auction is then received while the web page remains loaded in the browser, and replaces the first ad content in the third area responsive to the third area being scrolled into the second area while the web page remains loaded in the browser such that the second ad content is displayed within the second area while the web page remains loaded in the browser.

It is to be understood that both the foregoing general description and the following detailed description are exemplary and are not restrictive of the embodiments of the invention as claimed.

BRIEF DESCRIPTION OF THE DRAWINGS

All of the figures depict preferred embodiments although other embodiments are contemplated, and the present invention is not limited to the embodiments shown.

DETAILED DESCRIPTION

The present disclosure provides logic that can help publishers to better monetize their ad space inventory by providing additional opportunities to advertisers to publish their ads (e.g., text content, image content, graphic content, video content, audio content). The logic may be configured as software module(s), browser executable script(s), browser add-on(s), local application(s) activated via the browser, distributed software application(s), or any combination thereof programmed to real-time track and real-time react to real-time changes of the position of an ad slot element, e.g., defined area on a web page. The logic may further register in real-time an "impression," such as when an advertisement or "ad" is loaded into the ad slot on a client browser (i.e., a desktop browser, a laptop browser, a smartphone browser, a tablet browser, or others) and get additional information about that ad (sponsorship check, viewability, etc.) in real-time.

An ad is generally displayed by adding a creative (any one or more of text, graphic, audio, image, video) to an ad slot on a web page or application that becomes visible to the user on his or her user device (client device) as the advertisement. Once added to the web page, a notification otherwise referred to as the "impression" is sent back to the application server to confirm that the advertisement has been displayed. "Impressions" are what advertisers are ultimately interested in purchasing from web publishers.

When the ad slot remains below the fold, however, it is unviewed until the user scrolls the webpage. When in view, either through the original page load or upon a user scroll, the ad's impact lessens after a certain amount of time. Thus, the presently disclosed logic may run a second real-time auction between buyers to source and show another ad in an existing ad slot. As disclosed herein, the second real-time bid may not be initiated until after a first predetermined time period has expired, and according to certain aspects, may only occur for those ads that meet a second criterion, such as elapse of a second time period.

According to certain aspects, the logic may screen for human interaction using sensors that measure human movements including but not limited to mouse movement, scrolling, scrolling acceleration, CPU wattage usage and the determination of CPU latency. Such information may allow the logic to register in real-time when an ad slot is visible, i.e., above the fold, and when an ad slot that is below the fold may become visible.

According to certain aspects, the scrolling action on the client device may be via a touchscreen or a cursor, such as user interaction with a screen or mouse, respectively.

According to certain aspects, the logic may load and real-time scan some, many, most, or all existing ad slots (e.g., Google Publisher Tag (GPT) tags) on the web page, attach listeners to various GPT events (e.g., slot rendered, impression viewable), and initiate a client-side or server-to-server real-time auction based on predetermined logic and criteria.

For example, a prebid.js or other script can be loaded. The logic real-time tracks a position of each ad slot and real-time reacts to changes in the position. For each ad slot that satisfies certain eligibility conditions in real-time, the logic may initiate a server-to-server real-time auction via a prebid, or other request (e.g., prebid.js, other script). If an ad is returned in real-time, then the ad will be rendered in that slot, otherwise the ad will be ignored or removed.

There are certain timing issues that may arise due to network connectivity and traffic, i.e. communication between client and server and/or server to server. For example, in order to cause or enable a second real-time ad bidding auction to occur as fast as possible or to receive a responsive result from the second real-time ad bidding auction as fast as possible, there may be at least some consideration of a geolocation or a network location of the browser when the web page is at least one of initially requested, loading, or loaded.

For example, the geolocation can be obtained for a transceiver (e.g., a chip) configured for a signal triangulation from a plurality of orbital satellites or a plurality of cell sites (e.g., a cellular base station). For example, the transceiver can be a GPS transceiver, a GLONASS transceiver, or others. For example, the network location can be an IP address, a MAC address, a cell phone number, an area code, or others. For example, the geolocation can be within a geofenced area as preset in advance, whether statically or dynamically, or the network location can be within a range of IP addresses associated with a specific geographical area, which can be updated, whether statically or dynamically.

The geolocation or the network location can be requested, invoked, or obtained via a script embedded within the web page or preset into the browser, as disclosed herein. Resultantly, before, during, or after the second real-time ad bidding auction is requested, a processor (e.g., a client device) that runs the browser may obtain (e.g., identify) the geolocation (e.g., from the transceiver configured for the signal triangulation) or the network location of the browser (e.g., its IP address). Then, the processor may cause or enable the second real-time ad bidding auction for the second ad content to occur based on a shortest signal travel distance at that time (e.g., can be dynamically updated) or a quickest response time at that time (e.g., can be dynamically updated) based on the geolocation or the network location.

This causation or enablement can occur in various ways. For example, when the second real-time ad bidding auction is a server-to-server auction having a server (e.g., web server, application server, database server, a virtual server, a physical server) and a group (e.g., at least two) of servers (e.g., web server, application server, database server, a virtual server, a physical server) and the processor is in communication with the server (e.g., via a network card) and the server is in communication (e.g., via a network card) with the group of servers such that the server is logically interposed between the processor and the group of servers, then the processor may cause or enable the server to select at least one member of the group of servers based on the shortest signal travel distance (e.g., based on knowing geographical locations) or the quickest response time at that time (e.g., based on current or average ping time) based on the geolocation or the network location, where the server that is selected serves an auction-winning content to the server in communication with the processor. Note that the server (not member of the group of servers) itself may be a member of another group of servers. In such a scenario, the processor may select that server (from another group of servers) based on a script embedded within the web page or preset into the browser, as disclosed herein.

However, when the second real-time ad bidding auction is a client side auction having a client (e.g., the processor) being in communication (e.g., via a network card) with a group (e.g., at least two) of servers (e.g., web server, application server, database server, a virtual server, a physical server), then the processor selects one member of the group of servers based on the shortest signal travel distance (e.g., based on knowing geographical locations) or the quickest response time at that time (e.g., based on current or average ping time) based on the geolocation or the network location. This selection can occur based on a script embedded within the web page or preset into the browser, as disclosed herein.

This consideration of the geolocation or the network location of the browser has various technical effects. For example, when the web page is loaded on the browser of a mobile device that is powered by a battery, then the mobile device may be programmed for preserving the battery and, therefore, a server-to-server auction (e.g., the server communicating with the group of servers in an octopus manner) may be preferred at that time due to less computational load on the browser of the mobile device. However, when the mobile device is plugged-in for charging, then a client-side auction (e.g. the client device communicating with the group of servers in an octopus manner) may be preferred. However, either one of these forms of auction can be used, selected, or switched in-between, as needed, whether using or not using the geolocation or the network location.

For example, the server-to-server auction is less computationally intensive to the processor than the client-side auction and, therefore, when speed or battery power or computational cycles or bandwidth latency need to be prioritized, then the server-to-server auction can be used over the client-side auction. For example, the shortest signal travel distance may be a factor used when the processor or the server in communication with the processor knows that all of the group of servers are relatively equally optimized for responsive results at that time (e.g., relatively synchronized responses). However, when this knowledge is lacking or incomplete, then the quickest response time at that time may be a factor that is used, whether additionally or alternatively.

For example, there may be a first server and a second server in the group of servers, whether for the server-to-server auction or the client-side auction, where the first server is geographically closer to the processor or the server than the second server, and where the second server is responsively faster (e.g., better network connection or more RAM or faster CPU or better QOS parameters or less computational load) to the processor or the server than the first server. In such a situation, the second server may be selected over the first server, whether for the server-to-server auction or the client-side auction, since timing may be important when the user scrolls the web page such that the area programmed to contain the ad content from the first real-time ad bidding auction is to be currently displayed within the viewport of the browser in order to enable the ad replacement, as disclosed herein, to appear instantaneous and in real-time in order to minimize or avoid re-rendering of the web page when the ad replacement occurs.

According to certain aspects, the logic may use certain parameters to determine eligibility to real-time refresh an ad, i.e., a first ad in an ad slot positioned below the fold. Exemplary parameters may include (1) the ad slot is not displaying sponsored ads, (2) the ad slot is configured to be refreshed by the logic via a dashboard, (3) the ad slot is viewable, or (4) a current ad has been viewed (or ad slot is empty for a period of time).

According to certain aspects, the logic includes a JavaScript (or another script) tag/wrapper programmed for viewability tracking, initiating a real-time bidding (RTB) auction, programmatic for one or more of ad buying or selling, private marketplace placement, rendering an ad in existing ad slot, and others. Likewise, the logic includes a backend server (e.g., web, virtual, application, database) programmed to get additional data about sponsored ads (sponsorship check) and run an RTB auction (exchange).

According to certain aspects, the logic enables viewability tracking for ads. For example, a visible parameter implies that an ad is visible when a document (e.g., web page) is visible, and any part of the ad is in a viewport of a top window of a browser. Likewise, a viewable parameter implies that an ad is viewable when the ad is visible and a defined percentage of pixels up to 100% are within the users device's viewport (above the fold) for a defined duration of time that can easily be increased or decreased based on industry standards, or publisher or buyer requirements.

According to certain aspects, the logic enables rendering of an ad. For example, the logic can assume existence of a global GoogleTag instance. Reusing a Google Publisher Tag (GPT) may have a technical benefit of reusing publisher's configuration like targeting or category, or any other settings. The logic will not override these settings but will simply render an ad (although overriding is possible).

According to certain aspects, the logic enables a sponsored ads check. For example, when a first ad is rendered, the logic can call the backend server, with rendered ad info, and check if the first ad came through a sponsored line item. This may be done by checking line item details in a publishers DoubleClick for Publishers (DFP) account, wherein the publisher would need to provide a read Application Programming Interface (API) access to their DFP account if the publisher wants this feature enabled.

According to certain aspects, the logic enables an exchange. For example, the logic can initiate an RTB auction on the backend server. The client can provide some demand partner connections and some, many, most, or all necessary information.

According to certain aspects, the logic can be packaged in various ways. For example, the logic can include a module packaged as a single JavaScript tag which will run in a publisher's web page. The tag can be delivered directly in a website head element or via 1×1 pixel (or larger) creative (i.e., tracking pixel).

The logic may include tracking pixels for confirmation of ad placement. A tracking pixel may be a small (usually transparent) GIF or PNG image that may be embedded in script. Tracking pixels may be fetched from a third-party ad server, or from the web server (i.e., source of the webpage). If fetched from a third-party server, the advertisers may gather information about visitors when visitors request HTML content from the main webpage server and can thus track certain properties of the browsing habits of web users.

According to aspects, the backend server can be hosted on the client's Amazon Web Services (AWS) account, Google Cloud Platform (GCP), or another cloud service provider.

Figure 1:
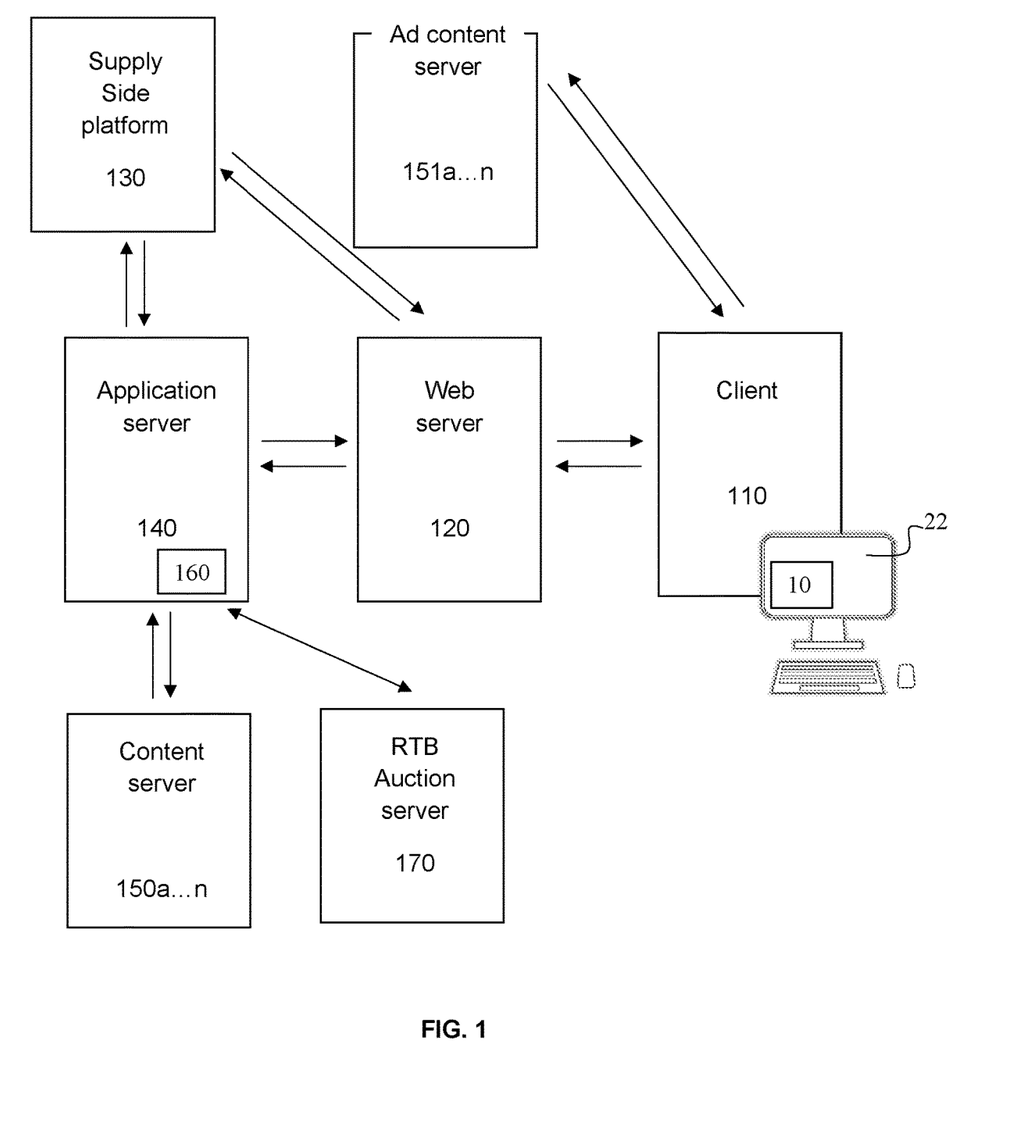
FIG. 1 is a diagrammatical overview of the communication flow of the present invention.

Referring to FIG. 1, which depicts a diagrammatical overview of the communication flow of the present invention, without reference to any particular type of network, there is a user device, i.e., client 110, having a display 22 on which a user may visualize an ad positioned within a displayed web content (webpage). The client 110 may be a stationary device, e.g., desktop, or mobile device such as a smart phone, tablet or other device. The client 110 may be configured to access web sites using HTTP protocol or another protocol. The webpage accessed by the client 110 may be sourced from a web server 120. Upon the user accessing the content of a requested publisher, the web server 120 returns the requested content to the user display 22, which may be in the form of HTML.

According to aspects of the present invention, the returned HTML may contain an opportunity to display an ad. The ad publisher, i.e., supply side platform 130, may communicate with an application server 140 to create/enter the keywords or categories that the ad publisher wants associated with the ad publisher's ad space, and receive from the application server 140 the software code comprising a script 10 to be embedded at the ad publisher's ad space. Alternatively, the supply side platform 130 may communicate directly through the web server 120 to the client.

The advertiser may communicate with one or more content servers 150*a-n* to license content to create an ad and with the application server 140 to enter the parameters and commands to retrieve the content files (the application server and the content server can comprise the same server), assemble them into the overall ad, preview and display the ad at the designated ad space, also including the keywords to be associated with the ad, possibly geographical, timing, or other parameters as to display of the ad, and a bid for display of the ad at the ad space when the script 10 on the publishers website is activated, such as by loading the webpage on the client 110.

Alternatively, the client 110 may communicate directly with one or more content servers 151*a-n* to retrieve the content files and assemble the ad on the webpage displayed on the client device.

The advertiser's ad parameters and commands and bid display may be stored as a file in an ad parameter and command file database 160 on the application server 140 (i.e., database, cache, or other quick access storage). When the script 10 embedded at an ad slot in a publisher's webpage is activated, it may communicate with the application server 140 and ad parameter and command file database 160 thereon, where relevant keywords and other information relating to the ad space are provided from the script 10. These may be used by the system software applications to conduct a RTB auction to select an ad for display from those that have the corresponding keywords and other parameters based on the bids placed with respect to such ads for display or based on ad parameters, including, but not limited to, click-through rate, ad space size, display region and ad type, or a combination of such parameters and bids. That is, selection of the ad may include consideration of parameters such as data type, data format, data size, and/or image resolution.

Once the auction is conducted and an ad is selected, the corresponding ad parameter and command file for the ad in the ad parameter and command file database 160 may be activated to retrieve the ad content files comprising the ad from the content server(s) 150*a-n* (or the application server 140), and to assemble and display the ad at the ad space. Meta data relating to the ad is sent back to the application server 140 for tracking and also charging for use of the licensed content and display of the ad at the ad space. The advertiser's account may be debited and the content licensors and ad publishers may be paid.

The presently disclosed logic may be embodied as part of a system-end computer equipped and configured for internet or other network communications, including an application server 140 including an ad parameter and command file database 160, and one or more software applications to execute a real-time auction to select an ad to be displayed at a particular network location. Moreover, the system-end computer may also include computer processing means and one or more Internet or other network communications interface software applications for interfacing with advertisers, providing a menu screen for advertisers to enter instructions for the creation of an ad, including messaging to be included in the ad, selection of an ad template, selection of digital content for the ad which may be licensed from third parties, and an area to enter instructions for an ad campaign, including selection of ad display locations, entry of cost-per-click bids for display of the ads and keywords or categories to be associated with the ad, and creating a data file in said dispatcher server database that contains parameters and commands to be used by the logic to provide access to said template advertisement file, licensed digital content, messaging, as well as the total cost-per-use of the licensed digital media files, the keywords/categories the ad will be associated, the network locations where the ad will be displayed and the advertiser's bid for display of the ad at the desired location.

The presently disclosed system may also include one or more content servers (e.g., ad content server 150*a-n*) configured and equipped for Internet or other network communications communicating with the application server 140 and/or network user/ad viewer-end computer systems, i.e., client 110, and having one or more digital content files stored thereon. Additionally, the system may include an ad publisher interface, such as on the application server 140, communicating with one or more ad publisher end computers configured and equipped for Internet or other network communications and also providing a menu screen for ad publishers to enter registration information, select categories or keywords to associate with their ad spaces and provide instructions to embed or install any number of scripts 10 on their ad spaces. When activated/initiated, the scripts 10 establish communications with the application server 140, causing a real-time auction to be executed for all advertisements in at least the command file database 160 with like parameters (e.g., the same keywords, categories and geographical region) and selecting one or more advertisements for display at the scripts 10 location based on the advertisers' bid for same or based on the advertisement parameters, including, but not limited to, click-through rate, ad space size, display region and ad type, or a combination of such parameters and bids, and then causing the selected ad to be displayed at the ad space by executing the instructions for the selected ad stored in the ad parameter/command file database 160 in the application server 140.

While ad selection via a RTB auction is described as including communication with the application server 140, wherein ad parameters are obtained from the ad parameter/command file database 160, such information may additionally or alternatively be obtained by communication with a database on a content server 150*a-n* either directly from the client (client 110 to content server 151*a-n*) or through the application server (application server 140 to content server 150*a-n*).

As noted previously, the auction occurs when a script 10 is activated/initiated anywhere on the network. The script 10 establishes communication with the relational database containing information on all of the advertisements ready for display in the ad space on the network (e.g., command file database 160), and sends a request for advertising. This request includes a variety of information not limited to the keywords or categories associated with the script 10 and the size and dimensions of the available advertising space. The system runs a comparison, based on an algorithm, of all advertisements in the database with keywords that match the keywords associated with the advertising display location up for auction. This algorithm takes into account a variety of customizable parameters, including, without limitation the type of bid on the advertisement and the click-through rate of the advertisement. The winning advertisement is then displayed in the advertising space. The advertisement displayed may also be assembled according to instructions in the same or other database. These instructions may call elements from a variety of locations and assemble them for display within the advertising module. All actions taken on the advertising content are then sent back to the relational database (e.g., command file database 160).

As described herein, the RTB auction may occur on the client server 110 (client-side auction) or on the application server 140 or a separate auction or bidding platform server 170 (server-to-server auction). Each auction or bidding platform server 170 may be bidding on behalf of one or more advertisers or campaigns. A content publisher may have the capacity to preempt an auction by maintaining a publisher ad server, and pre-cached criteria for which, when satisfied, preempts delivery of the ad opportunity and directs the client 110 to the publisher ad server (e.g., content server 150).

When an ad opportunity is fulfilled, the content server 150 or application server 140 of the winning bid passes instructions for retrieving the ad, such as to the supply-side platform 130, and then to an open HTTP connection of the client 110, or directly to the client 110. According to certain aspects, the instructions may be passed through additional locations such as a publisher ad server.

The client 110 then follows the instructions to retrieve the ad from a content server 150 or 151. In one embodiment, the content server 150 may be advantageously contained within the application server 140. Upon receiving the request for the placement of an ad, the content server 150 or application server 140 delivers the ad to the browser on the display 22 of the client 110 or delivers the address of the ad to the browser, which in turn may retrieve the ad from the address indicated.

Figure 3:
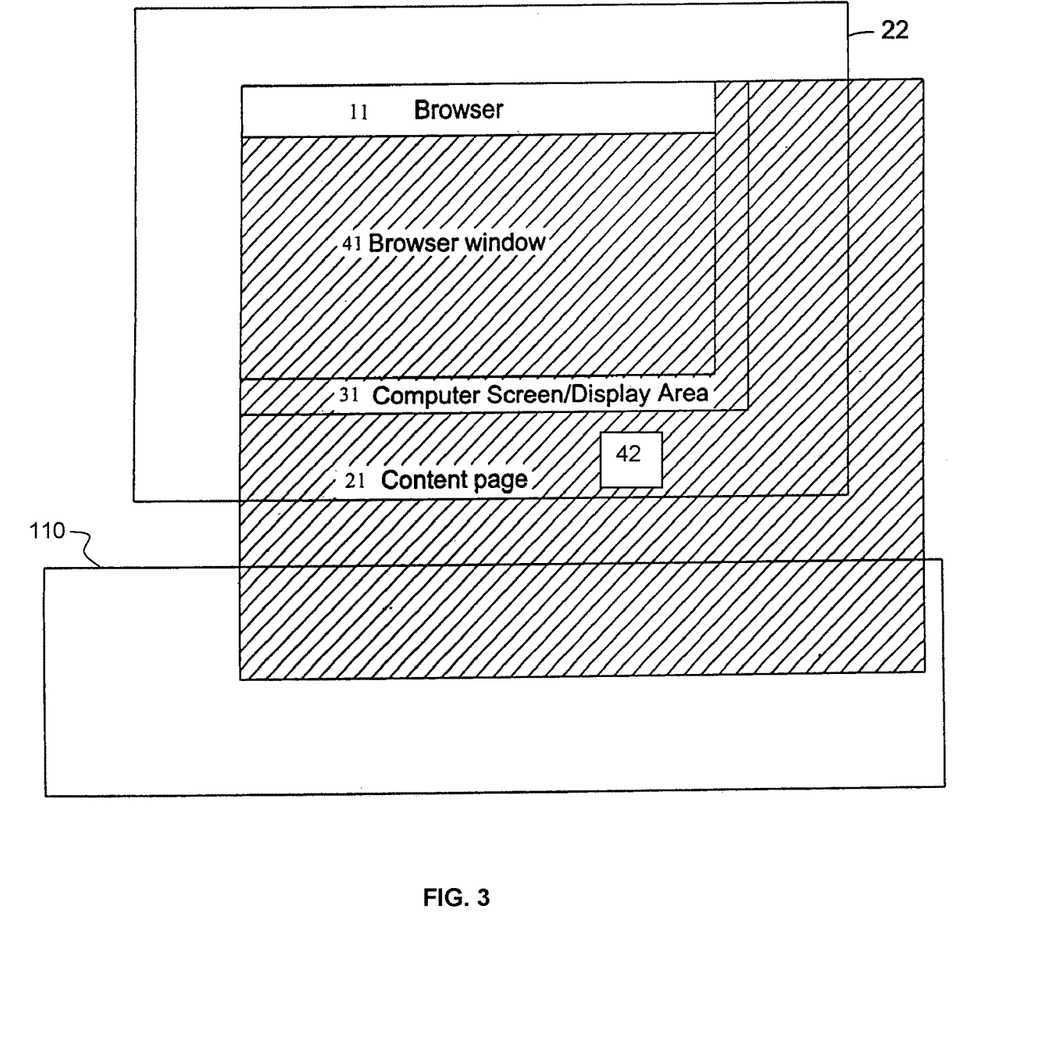
FIG. 3 is a diagrammatical overview of the interplay and overlap of a viewer's screen display area, browser application, browser window and ad content display page.

An ad may be displayed within a webpage on a display 22 of the client 110. As shown in FIG. 3, the content of the webpage (content page 21 or first area) may be larger than the browser window 41 (or second area) shown on the display 22, based on the size of the display area 31 and/or a size of the browser window 41 selected by the user (e.g., resizing of the browser window). If an ad is loaded in an ad slot on the content page 21 that is outside of the viewable area of the browser window 41, such as ad 42 or third area, it would not be viewable by the user until the content page 21 is scrolled upward. According to methods of the present invention, a second RTB auction may be used to position a second ad within this ad slot (e.g., 42).

According to various aspects, ad slot 42 may have a first ad positioned therein or may be empty before the second RTB auction is initiated. For example, activation of a script 10 can be controlled to occur a first time (i.e., initiate a first RTB auction for that ad slot) when that ad slot is within, or within a pre-defined distance outside of, the second area (41). This information may be gathered from sensors (e.g., tracking pixel) associated with the script 10 and/or separate from the script 10.

Script Logic and Events

According to certain aspects, the logic enables a second RTB to be initiated to place a second ad within an ad slot.

According to certain aspect, the logic enables a dashboard inclusive of a primary dashboard with basic reporting (e.g., breakdown per publisher and tag) and a secondary dashboard having a publishers and sites management section (e.g., site management includes configuration about which ad slot should be refreshed, and ad units (tags) management section), a publisher dashboard (e.g., main dashboard with basic reporting), a setup AWS account wizard, and a setup exchange interface to connect to demand partners.

For example, the dashboard can include a bidding dashboard including, for example, a widget types section, a user management section, and an ad quality management. That is, the bidding dashboard may comprise a real-time verification system that sits on the client side and is integrated into a publisher's ad server, the publisher's header, or onto their page, and is able to analyze the impressions post-auction but pre-render.

Further, the dashboard can include a reporting section (e.g., report builder), a discrepancies section, an ad management logic (e.g., ads.txt management, crawler, monitoring ads.txt status on each domain), and/or a publisher dashboard (e.g., site management section, submitting new sites).

Further still, the dashboard can include an additional reporting section (e.g., report scheduling), a site management and approvals section, a managing tag ordering requests from publishers, a new ad unit request management, and/or a publisher dashboard (e.g., ads.txt management).

According to certain aspects, the logic enables a unified wrapper that combines a live viewability screening, automated sponsorship exclusions based on DFP priorities, and real-time, server-to-server, auction capabilities based on viewability for ad units both above and below the fold. Some current header bidder wrappers may use historical and predictive logic when targeting ad units based on viewability. This is so because current header bidder auctions end before the web page is rendered. Since the web page is rendered after the header bidder auction ends, there is some difficulty for the header bidder to know in real-time what ad units will meet the viewability criteria. Users have not had a chance to interact with the page before the auction has ended. Some use case where current header bidder solutions could fall short vs the logic described herein. For example, the user could scroll (i.e., via a touchscreen or using a mouse directed cursor) past the ad too quickly to meet minimum viewable standards or the user could minimize their browser window before the ad meets minimum viewable standards or the browser session could fail.

When bidders bid on ad units when the web page loads, the user opens up a browser session and in some milliseconds to click on a browser, type in a uniform resource locator (URL), and hit enter to access the web page, there is a header bidder auction occurring based upon parameters pre-established for the ad inventory on the webpage. The header bidder auction can include some, many, most, or all the ad units, including the ad units that are for below the fold. At that time, the auction is over, the bids are in before the web page renders (e.g., auction ended before anybody sees any content). As such, there is no way of knowing in real-time, when the original header bidder auction happens, whether or not anybody had scrolled those below the fold units into a user view since the auction ends before the page is rendered. Therefore, when the header bidders bid on those units that are below the fold, then those bidders are offering a price based upon history and predictive analysis of whether someone might scroll above the fold, not actually scroll above the fold. As such, the tag allows holding a second auction after the web page has already loaded, among multiple demand sources simultaneously (e.g., server-to-server), but only when those below the fold units had been scrolled into the user view.

According to certain aspects, a tag (e.g., script) is embedded into a web page, where the tag tracks a user event associated with the web page. In particular, the tag enables a server-to-server real-time auction for the below the fold ad units (e.g., image, text, audio, graphics) as the below the fold ad units become viewable (e.g., user scrolled below the fold ad units into user view).

Figure 2:
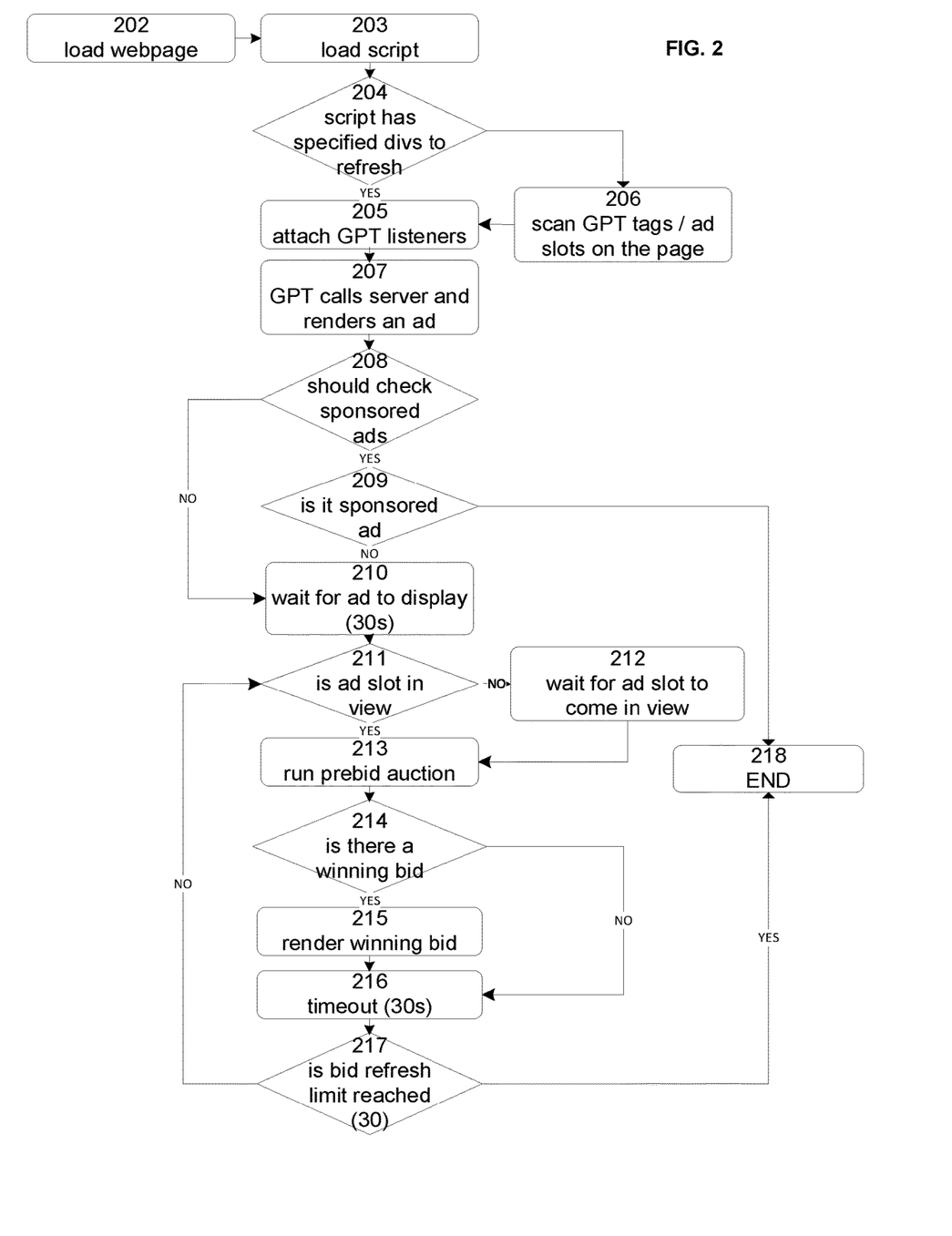
FIG. 2 is a flow chart depicting the ad spot-auction process flow.

With reference to FIG. 2, a method enabled by the logic of the presently disclosed invention is described. For example, and with reference to FIG. 2, a user may load a webpage into a browser on their device (client 110), as shown in step 202, wherein a script associated with an ad slot on a webpage is loaded (203). As noted in step 204, if the script includes one or more sections or divisions ("divs") that specify refresh times, the method may attach GPT listeners that allow set up and call to a script function (e.g., JavaScript) when a specific GPT event happens, as shown at 205. If no divs for refresh times are included with the script, such as shown in step 206, the method may include scanning for GPT tags and/or ad slots on the page and attaching GPT listeners thereto (205).

The GPT listeners may make calls to a server, such as the application server or a content server, and may render an ad within an ad slot, as indicated at 207. The method may check for sponsored ads (208), and if such are indicated to be positioned in the ad slot (209), the method would not provide any additional action at that ad slot (i.e., end at step 218).

If, however, no sponsored ads are to be positioned in the ad slot, the method may wait for the ad to be loaded in the browser for a predetermined time period, such as for up to 30 seconds as shown in step 210. The ad may or may not be viewable period (i.e., may or may not be "above the fold" or in the second area). The method may check to see that the ad is in viewable portion of the client viewport (211; i.e., second area), after the predetermined wait time has expired, e.g., 30 seconds, and if it is found to be in view, the method runs a prebid auction (i.e., second RTB auction) for that ad slot (213). Otherwise, if the ad is not found to be in view at step 211, the method may wait for that ad to come into view before running the rebid auction (213).

As shown in 214, a successful bid for that ad slot in the second RTB auction allows a second ad content to be displayed in the ad slot (215). At this stage, the method may set a view time limit, such as for up to 30 seconds as shown in step 216 (i.e., timeout of 30 seconds), and if a bid refresh limit has not yet been reached (217), the method may initiate an addition RTB auction (e.g., third or fourth, etc.) and proceed through steps 211-216 again as described above. If, however, the bid refresh limit has been reached (217), the method may not provide any additional action at that ad slot (i.e., end at step 218).

Alternatively, an unsuccessful bid in the second RTB (214) would lead to a timeout (e.g., wait time of about 30 seconds, 216), after which, if a bid refresh limit has not yet been reached (217), the method may initiate an addition RTB auction (e.g., third or fourth, etc.) and proceed through steps 211-216 as described above. If, however, the bid refresh limit has been reached (217), the method may not provide any additional action at that ad slot (i.e., end at step 218).

According to certain aspects of the presently disclosed invention, and as described and shown according to aspects of FIG. 2, a client having a browser (e.g., desktop, laptop, smartphone, tablet) accesses a web server serving a web page to the client browser, and loads that webpage ("first area") into a viewport ("second area") of the client. The web page may host a tag (e.g., Javascript tag, "script") and an ad unit. For example, the ad unit can include a defined area (e.g., square, rectangle, polygon, circle, oval, symmetrical, asymmetrical, closed-shape, open-shape; "third area") of the web page into which an ad content is selectively input based on a set of criteria, whether static or dynamic.

The ad unit can be positioned below the fold when the web page is loaded, i.e., the third area is not yet positioned in the second area. As such, a first real-time auction can take place before the ad unit is scrolled into the user view for a defined time period, such as triggered on loading the webpage to the client browser.

The ad unit can be scrolled into the user view based on at least a portion of the ad unit being visible. For example, the portion can include at least about 0.1%, about 1%, about 5%, about 10%, about 15%, about 20%, about 25%, about 30%, about 35%, about 40%, about 45%, about 50%, about 50.1%, about 51%, about 55%, about 60%, about 65%, about 70%, about 75%, about 80%, about 85%, about 90%, about 95% percent of an area of the ad unit or any percentage in between. For example, the defined time period can include at least about 0.5 seconds, about 1 second, about 2 seconds, about 3 seconds, about 4 seconds, about 5 seconds, about 6 seconds, about 7 seconds, about 8 seconds, about 9 seconds, about 10 seconds, about 15 seconds, about 20 seconds, about 25 seconds, about 30 seconds, about 35 seconds, about 40 seconds, about 45 seconds, about 50 seconds, about 55 seconds, about 60 seconds, about 65 seconds, or more, or any number in between.

The first real-time auction can be enabled via a Prebid program, which can be implemented using a JavaScript (e.g., prebid.js) to manage the first real-time auction on the client side (e.g., within a browser). The first real-time auction can include a server-to-server real-time auction, which can happen with a call back to the server. For example, the web page includes the ad unit and the tag. The tag, upon load, makes a call to an ad publisher server (e.g., Rubicon, OpenX, Index Exchange) for inputting an ad content into the ad unit. The ad unit may not be visible at this point. The call enables a bid request to the ad publisher server informative of a current impression matching the client browser (e.g., knowledge of user operating client browser). In response, the ad publisher server collects a set of bids from a set of bidders for that ad unit. The ad publisher server then determines a highest bid from the set of bids and prepares the ad content for input into the ad unit. As such, the first real-time auction occurs for inputting the ad content into the ad unit, which can occur when the ad unit has not been scrolled into the user view.

As described above with respect to FIG. 2, the logic and method of the presently disclosed invention may make a first real-time determination whether the first ad content has been loaded in the web page for a predefined time period while the web page remains loaded in the browser (211). This first real-time determination is initiated by the script (10, i.e., tag associated with the ad slot) while the web page remains loaded in the browser. For example, after the web page is loaded in the client browser and after the first real-time auction happens, the tag is now on the web page and would determine in a certain amount of time whether to request the secondary auction using the Prebid program or other script.

The determination regarding whether to run a second RTB auction may use a second real-time determination, which may query whether the ad slot (i.e., third area) has been scrolled into the viewport of the client (i.e., second area) as of the expiration of the predefined time period while the web page remains loaded in the browser, or after the expiration of the predefined time period while the web page remains loaded in the browser. The second real-time determination may be via the script while the web page remains loaded in the browser, wherein the second real-time determination is based on the first real-time determination determining that the first ad content has been loaded in the web page for the predefined time period while the web page remains loaded in the browser.

As such, the second real-time auction can take place after a set time period, i.e., predetermined time period, after a first ad content is loaded in to the webpage, such as after the ad is loaded onto the webpage but before the ad unit is scrolled into the user view, or after the ad unit is in the user view for the defined time period. The ad unit can be scrolled into the user view based on at least a portion of the ad unit being visible. For example, the portion can include at least about 0.1%, about 1%, about 5%, about 10%, about 15%, about 20%, about 25%, about 30%, about 35%, about 40%, about 45%, about 50%, about 50.1%, about 51%, about 55%, about 60%, about 65%, about 70%, about 75%, about 80%, about 85%, about 90%, about 95% percent of an area of the ad unit or any percentage in between. For example, the defined time period can include at least about 0.5 seconds, about 1 second, about 2 seconds, about 3 seconds, about 4 seconds, about 5 seconds, about 6 seconds, about 7 seconds, about 8 seconds, about 9 seconds, about 10 seconds, about 15 seconds, about 20 seconds, about 25 seconds, about 30 seconds, about 35 seconds, about 40 seconds, about 45 seconds, about 50 seconds, about 55 seconds, about 60 seconds, about 65 seconds, or more, or any number in between.

Therefore, the tag (script) tracks the ad unit being scrolled into user view. For example, the tag can track the ad unit being scrolled into the user view based on determining a viewport area (e.g., display area of browser) in terms of pixels, determining a web page area in terms of pixels, and then determining what section of the web page area is currently within the viewport area (e.g., similar to how sniper scope operates where sniper scope corresponds to viewport area).

If that section contains the ad unit and the ad unit would be or is visible for the defined time period when in the user view, then the second real-time auction is conducted. Therefore, the tag enables the first real-time auction for the ad unit below the fold to take place upon the web page being loaded. Then, the tag monitors the web page as the web page is being viewed within the viewport. Once the tag determines that the ad unit is positioned above the fold or scrolled into view or shown within the viewport for the defined time period, then the tag can launch the second real-time auction, whether on client side or server-to-server.

For example, the ad unit can be refreshed accordingly (e.g., waiting to refresh until ad unit is in view). However, note that the web page can be not refreshed as well.

Note that the client side auction can occur via the client browser running the tag when the web page is loaded and, when the ad unit is scrolled into the user view, the tag can make a call to multiple ad bidders (e.g., X number of calls to multiple ad bidders happen on the page) for auction purposes.

Likewise, note that server-to-server calls can occur via the client browser running the tag when the page is loaded and, when the ad unit is scrolled into the user view, the tag can make a single call to a first server which then responsively interfaces with a second server(s). Unlike the client side auction which involves the tag in the client browser placing multiple calls to the multiple bidders, the server-to-server auction is technically beneficial because of lighter computational load on the client browser since the first server interfaces with the second server(s) and the tag makes the single call to the first server and responsively receives a single request from the first server (e.g., first server deals with multiple second servers). Therefore, at least some latency is removed and browsing via the client server can become faster.

For example, the server-to-server auction can allow inclusion of a large amount of bidding partners (e.g., second servers interfacing with first server) versus the client side auction, which can be limited to an amount of calls the client browser can make due to at least some potential browsing latency. For example, the second server can include a publisher server (e.g., Rubicon, OpenX, Index Exchange). Moreover, various requirements of the client, such as power management for battery powered clients (e.g., cell phones, tablets), may make client-side auctions slower and less optimal (i.e., increased latency as power degrades, leading to reduced network connectivity).

According to certain aspects, the logic can enable a certain built-in delay to allow credit for the first ad unit before the second ad unit is placed. For example, such delay can be based on a time period (e.g., about 0.5 seconds, about 1 second, about 2 seconds, about 3 seconds, about 4 seconds, about 5 seconds, about 6 seconds, about 7 seconds, about 8 seconds, about 9 seconds, about 10 seconds, about 15 seconds, about 20 seconds, about 25 seconds, about 30 seconds, about 35 seconds, about 40 seconds, about 45 seconds, about 50 seconds, about 55 seconds, about 60 seconds, about 65 seconds, or more, or any number in between) from when the ad unit loads or is in view from the first real-time auction before refreshing the ad unit based on the second real-time auction. For example, once a certain amount of the ad unit below that fold is scrolled into the user view (e.g., at least 50% of pixels of ad unit) and that certain amount remains user viewable for a certain period of time (e.g., 30 seconds), then the second real-time auction can be responsively activated and then the ad unit can be responsively refreshed based on the second real-time auction.

For example, the web page with the tag and the ad unit can be loaded into the client browser where the ad unit is below the fold and is not user visible. The timer can start counting in accordance with the time period from when the ad unit has loaded even though the ad unit may not be user visible. The web page can remain loaded for a certain time period (e.g., about 0.5 seconds, about 1 second, about 2 seconds, about 3 seconds, about 4 seconds, about 5 seconds, about 6 seconds, about 7 seconds, about 8 seconds, about 9 seconds, about 10 seconds, about 15 seconds, about 20 seconds, about 25 seconds, about 30 seconds, about 35 seconds, about 40 seconds, about 45 seconds, about 50 seconds, about 55 seconds, about 60 seconds, about 65 seconds, or more, or any number in between) and then after the certain time period the user can scroll the ad unit into user view. Then, the ad unit can be flagged and accordingly refreshed because the certain time period has expired. Therefore, when the ad unit comes into user view, based on the certain amount of the ad unit being user visible for the certain time period, then the ad unit is refreshed (e.g., minimum of certain time period before the ad unit can be refreshed and while ad unit is user visible). For example, the ad unit can be above the fold for at least the certain amount of the ad unit (e.g., percentage of pixels of ad unit above fold).

Modes of Operation

In one mode of operation, there is a web page having an area programmed to contain an ad content from a first real-time ad bidding auction. When the web page is initially loaded, this area is not displayed within a viewport of a browser (e.g., below the fold). When a user scrolls the web page such that this area is to be currently displayed within the viewport of the browser by at least a defined amount, if a first predetermined time has expired, the ad may be determined to be viewable for a second predetermined time, after which a second RTB auction may be initiated, and upon a successful bit, a second ad may be placed over or entirely replace the first ad.

In another mode of operation, there is a web page having an area programmed to contain an ad content from a first real-time ad bidding auction. When the web page is initially loaded, this area is not displayed within a viewport of a browser (e.g., below the fold). When a user scrolls the web page such that this area is to be currently displayed within the viewport of the browser by at least a defined amount, if a first predetermined time has not expired, an elapsed time period may be determined. If the elapsed time period is the same as or greater than a second predetermined time period, a second RTB auction may be initiated, and upon a successful bit, a second ad may be placed over or entirely replace the first ad.

In either above mode, the defined time period may be about 0.5 seconds, about 1 second, about 2 seconds, about 3 seconds, about 4 seconds, about 5 seconds, about 6 seconds, about 7 seconds, about 8 seconds, about 9 seconds, about 10 seconds, about 15 seconds, about 20 seconds, about 25 seconds, about 30 seconds, about 35 seconds, about 40 seconds, about 45 seconds, about 50 seconds, about 55 seconds, about 60 seconds, about 65 seconds, or more, or any number in between, such as 30 seconds, and the first predetermined time may be about 0.5 seconds, about 1 second, about 2 seconds, about 3 seconds, about 4 seconds, about 5 seconds, about 6 seconds, about 7 seconds, about 8 seconds, about 9 seconds, about 10 seconds, about 15 seconds, about 20 seconds, about 25 seconds, about 30 seconds, about 35 seconds, about 40 seconds, about 45 seconds, about 50 seconds, about 55 seconds, about 60 seconds, about 65 seconds, or more, or any number in between, such as 6 seconds. In either above mode, the defined amount may be about 0.1%, about 1%, about 5%, about 10%, about 15%, about 20%, about 25%, about 30%, about 35%, about 40%, about 45%, about 50%, about 50.1%, about 51%, about 55%, about 60%, about 65%, about 70%, about 75%, about 80%, about 85%, about 90%, about 95% percent of an area of the ad unit is displayed or any percentage in between, such as 50%.

In either of the above modes, the client, i.e., a processor of the client, may identify a geolocation or a network location of the browser when the web page is requested, loading, and/or loaded. The client may further cause the second real-time ad bidding auction for the second ad content to occur based on a shortest signal travel distance at that time or a quickest response time at that time based on the geolocation or the network location. The geolocation may be based on the processor communicating with a satellite positioning receiver or a cell site, and the network location may be based on a network address of the browser.

According to a mode of operation, the second RTB auction may be a server-to-server auction having a server and a group of servers, wherein the processor is in communication with the server, which is in communication with the group of servers such that the server is logically interposed between the processor and the group of servers. The server selects one member of the group of servers based on the shortest signal travel distance or the quickest response time based on the geolocation or the network location. In this case, the server selects the one member of the group of servers based on the shortest signal travel distance based on the geolocation or the network location, or may selects the one member of the group of servers based on the quickest response time based on the geolocation or the network location.

According to another mode of operation, the second RTB auction may be a client side auction, wherein the client is in communication with a group of servers, and the processor of the client selects one member of the group of servers based on the shortest signal travel distance or the quickest response time based on the geolocation or the network location. The client processor may select the one member of the group of servers based on the shortest signal travel distance based on the geolocation or the network location. Alternatively, the client processor may select the one member of the group of servers based on the quickest response time based on the geolocation or the network location.

Aspects of the Present Disclosure

Aspect 1. A method and/or a memory storing a set of instructions executable by a browser to perform the method, wherein the method comprises: loading, by a processor, a web page in a browser having a viewport, wherein the web page has a first area, wherein the viewport has a second area, wherein the first area is larger than the second area, wherein the web page has a script embedded therein, wherein the first area contains a third area, wherein the first area is larger than the third area, wherein the third area is not positioned within the second area when the web page is loaded, wherein the third area contains a first ad content sourced from a first real-time ad bidding auction; performing, by the processor, a first real-time determination whether the first ad content has been loaded in the web page for a predefined time period while the web page remains loaded in the browser, wherein the first real-time determination is via the script while the web page remains loaded in the browser; performing, by the processor, a second real-time determination whether the third area has been scrolled into the second area at least one of as of or after the expiration of the predefined time period while the web page remains loaded in the browser, wherein the second real-time determination is via the script while the web page remains loaded in the browser, wherein the second real-time determination is based on the first real-time determination determining that the first ad content has been loaded in the web page for the predefined time period while the web page remains loaded in the browser; requesting, by the processor, a second real-time ad bidding auction for a second ad content to be input into the third area and replace the first ad content responsive to the third area being scrolled into the second area based on the second real-time determination while the web page remains loaded in the browser, wherein the second real-time ad bidding auction occurs while the web page remains loaded in the browser; receiving, by the processor, the second ad content sourced from the second real-time ad bidding auction while the web page remains loaded in the browser; and replacing, via the processor, the first ad content in the third area with the second ad content responsive to the third area being scrolled into the second area while the web page remains loaded in the browser such that the second ad content is displayed within the second area while the web page remains loaded in the browser.

Aspect 2. The method or memory of aspect 1, wherein the second real-time ad bidding auction is a client-side auction or a server-to-server auction.

Aspect 3. The method or memory of any preceding aspect, wherein the predefined time period is at least about 1 second, such as about 0.5 seconds, about 1 second, about 2 seconds, about 3 seconds, about 4 seconds, about 5 seconds, about 6 seconds, about 7 seconds, about 8 seconds, about 9 seconds, about 10 seconds, about 15 seconds, about 20 seconds, about 25 seconds, about 30 seconds, about 35 seconds, about 40 seconds, about 45 seconds, about 50 seconds, about 55 seconds, about 60 seconds, about 65 seconds, or more, or any number in between.

Aspect 4. The method or memory of any preceding aspect, wherein the script requests the second real-time ad bidding auction.

Aspect 5. The method or memory of any preceding aspect, wherein the first real-time ad bidding auction is a server-to-server auction or a client-side auction.

Aspect 6. The method or memory of any preceding aspect, wherein the first ad content and the second ad content are identical to each other in at least one of data type, data format, data size, or image resolution, or wherein the first ad content and the second ad content are not identical to each other in at least one of data type, data format, data size, or image resolution.

Aspect 7. The method or memory of any preceding aspect, wherein the first ad content is replaced with the second ad content in the third area before the third area is displayed within the second area.

Aspect 8. The method or memory of any preceding aspect, wherein the first ad content is replaced with the second ad content in the third area while the third area is displayed within the second area.

Aspect 9. The method or memory of any preceding aspect, wherein the third area is scrolled into the second area via a touchscreen, or wherein the third area is scrolled into the second area via a cursor.

Aspect 10. The method or memory of any preceding aspect, wherein the second ad content replaces the first ad content based on the second ad content being displayed over the first ad content, or wherein the second ad content replaces the first ad content based on the first ad content being removed from the third area and the second ad content being inserted into the third area.

Aspect 11. The method or memory of any preceding aspect, wherein the first real-time determination, the second real-time determination, the second real-time ad bidding auction, and replacing of the first ad content in the third area with the second ad content is instructed by the script.

Aspect 12. The method or memory of any preceding aspect, wherein the browser includes a just-in-time engine executing the script.

Aspect 13. The method or memory of any preceding aspect, wherein the second real-time determination occurs during scrolling.

Aspect 14. The method or memory of any preceding aspect, wherein at least about 0.1%, about 1%, about 5%, about 10%, about 15%, about 20%, about 25%, about 30%, about 35%, about 40%, about 45%, about 50%, about 50.1%, about 51%, about 55%, about 60%, about 65%, about 70%, about 75%, about 80%, about 85%, about 90%, about 95% percent of an area of the ad unit is displayed or any percentage in between.

Aspect 15. The method or memory of any preceding aspect, wherein the first ad content is displayed about 33% percent in pixels, or at least 50% in pixels, or at least 75% in pixels for at least about 1 second within the second area while the web page remains loaded in the browser prior to the requesting of the second real-time ad bidding auction for the second ad content; or wherein the first ad content is fully displayed in pixels for at least about 1 second within the second area while the web page remains loaded in the browser prior to the requesting of the second real-time ad bidding auction for the second ad content; or wherein the first ad content is displayed at least 50% in pixels for at least about 6 seconds within the second area while the web page remains loaded in the browser prior to the requesting of the second real-time ad bidding auction for the second ad content.

Aspect 16. The method or memory of any preceding aspect, wherein the browser includes a just-in-time engine, wherein the set of instructions is executable by the just-in-time engine.

Aspect 17. The method or memory of any preceding aspect, further comprising causing, by the processor, a geolocation or a network location of the browser to be identified when the web page is at least one of requested, loading, or loaded; and causing, by the processor, the second real-time ad bidding auction for the second ad content to occur based on a shortest signal travel distance at that time or a quickest response time at that time based on the geolocation or the network location.

Aspect 18. The method or memory of aspect 17, wherein the geolocation is based on the processor communicating with a satellite positioning receiver or a cell site.

Aspect 19. The method or memory of aspect 17, wherein the network location is based on a network address of the browser.

Aspect 20. The method or memory of aspect 17, wherein the second real-time ad bidding auction is a server-to-server auction having a server and a group of servers, wherein the processor is in communication with the server, where the server is in communication with the group of servers such that the server is logically interposed between the processor and the group of servers, wherein the server selects one member of the group of servers based on the shortest signal travel distance or the quickest response time based on the geolocation or the network location.

Aspect 21. The method or memory of aspect 20, wherein the server selects the one member of the group of servers based on the shortest signal travel distance based on the geolocation or the network location; or wherein the server selects the one member of the group of servers based on the quickest response time based on the geolocation or the network location.

Aspect 22. The method or memory of aspect 17, wherein the second real-time ad bidding auction is a client side auction having a client being in communication with a group of servers, wherein the client includes the processor, wherein the processor selects one member of the group of servers based on the shortest signal travel distance or the quickest response time based on the geolocation or the network location.

Aspect 23. The method or memory of aspect 22, wherein the processor selects the one member of the group of servers based on the shortest signal travel distance based on the geolocation or the network location; or wherein the processor selects the one member of the group of servers based on the quickest response time based on the geolocation or the network location.

This disclosure may, however, be embodied in many different forms and should not be construed as necessarily being limited to only embodiments disclosed herein. Rather, these embodiments are provided so that this disclosure is thorough and complete, and fully conveys various concepts of this disclosure to skilled artisans.

Note that various terminology used herein can imply direct or indirect, full or partial, temporary or permanent, action or inaction. For example, when an element is referred to as being "on," "connected" or "coupled" to another element, then the element can be directly on, connected or coupled to the other element or intervening elements can be present, including indirect or direct variants. In contrast, when an element is referred to as being "directly connected" or "directly coupled" to another element, there are no intervening elements present.

Likewise, as used herein, a term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

Similarly, as used herein, various singular forms "a," "an" and "the" are intended to include various plural forms as well, unless context clearly indicates otherwise. For example, a term "a" or "an" shall mean "one or more," even though a phrase "one or more" is also used herein.

Moreover, terms "comprises," "includes" or "comprising," "including" when used in this specification, specify a presence of stated features, integers, steps, operations, elements, or components, but do not preclude a presence and/or addition of one or more other features, integers, steps, operations, elements, components, or groups thereof. Furthermore, when this disclosure states that something is "based on" something else, then such statement refers to a basis which may be based on one or more other things as well. In other words, unless expressly indicated otherwise, as used herein "based on" inclusively means "based at least in part on" or "based at least partially on."

Additionally, although terms first, second, and others can be used herein to describe various elements, components, regions, layers, or sections, these elements, components, regions, layers, or sections should not necessarily be limited by such terms. Rather, these terms are used to distinguish one element, component, region, layer, or section from another element, component, region, layer, or section. As such, a first element, component, region, layer, or section discussed below could be termed a second element, component, region, layer, or section without departing from this disclosure.

Also, unless otherwise defined, all terms (including technical and scientific terms) used herein have the same meaning as commonly understood by one of ordinary skill in an art to which this disclosure belongs. As such, terms, such as those defined in commonly used dictionaries, should be interpreted as having a meaning that is consistent with their meaning in a context of a relevant art and should not be interpreted in an idealized or overly formal sense unless expressly so defined herein.

In addition, features described with respect to certain example embodiments may be combined in or with various other example embodiments in any permutational or combinatory manner. Different aspects or elements of example embodiments, as disclosed herein, may be combined in a similar manner. The term "combination", "combinatory," or "combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

Various embodiments of the present disclosure may be implemented in a data processing system suitable for storing and/or executing program code that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The present disclosure may be embodied in a system, a method, and/or a computer program product. The computer program product may include a computer readable storage medium (or media) having computer readable program instructions thereon for causing a processor to carry out aspects of the present disclosure. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

Features or functionality described with respect to certain example embodiments may be combined and sub-combined in and/or with various other example embodiments. Also, different aspects and/or elements of example embodiments, as disclosed herein, may be combined and sub-combined in a similar manner as well. Further, some example embodiments, whether individually and/or collectively, may be components of a larger system, wherein other procedures may take precedence over and/or otherwise modify their application. Additionally, a number of steps may be required before, after, and/or concurrently with example embodiments, as disclosed herein. Note that any and/or all methods and/or processes, at least as disclosed herein, can be at least partially performed via at least one entity or actor in any manner.

Although preferred embodiments have been depicted and described in detail herein, skilled artisans know that various modifications, additions, substitutions and the like can be made without departing from spirit of this disclosure. As such, these are considered to be within the scope of the disclosure, as defined in the following claims.

The invention claimed is:

1. A method comprising:
   loading, by a processor, a web page in a browser having a viewport, wherein the web page has a first area, wherein the viewport has a second area, wherein the first area is larger than the second area, wherein the web page has a script embedded therein, wherein the first area contains a third area, wherein the first area is larger than the third area, wherein the third area is not positioned within the second area when the web page is loaded, wherein the third area contains a first ad content sourced from a first real-time ad bidding auction;
   performing, by the processor, a first real-time determination whether the first ad content has been loaded in the web page for a predefined time period while the web page remains loaded in the browser, wherein the first real-time determination is via the script while the web page remains loaded in the browser;

performing, by the processor, a second real-time determination whether the third area has been scrolled into the second area at least one of as of or after the expiration of the predefined time period while the web page remains loaded in the browser, wherein the second real-time determination is via the script while the web page remains loaded in the browser, wherein the second real-time determination is based on the first real-time determination determining that the first ad content has been loaded in the web page for the predefined time period while the web page remains loaded in the browser;

requesting, by the processor, a second real-time ad bidding auction for a second ad content to be input into the third area and replace the first ad content responsive to the third area being scrolled into the second area based on the second real-time determination while the web page remains loaded in the browser, wherein the second real-time ad bidding auction occurs while the web page remains loaded in the browser;

receiving, by the processor, the second ad content sourced from the second real-time ad bidding auction while the web page remains loaded in the browser; and replacing, via the processor, the first ad content in the third area with the second ad content responsive to the third area being scrolled into the second area while the web page remains loaded in the browser such that the second ad content is displayed within the second area while the web page remains loaded in the browser.

2. The method of claim 1, wherein the second real-time ad bidding auction is a client-side auction.

3. The method of claim 1, wherein the second real-time ad bidding auction is a server-to-server auction.

4. The method of claim 1, wherein the predefined time period is inclusively between at least about 1 second and about 65 seconds.

5. The method of claim 1, wherein the script requests the second real-time ad bidding auction.

6. The method of claim 1, wherein the first real-time ad bidding auction is a server-to-server auction.

7. The method of claim 1, wherein the first real-time ad bidding auction is a client-side auction.

8. The method of claim 1, wherein the first ad content and the second ad content are identical to each other in at least one of data type, data format, data size, or image resolution.

9. The method of claim 1, wherein the first ad content and the second ad content are not identical to each other in at least one of data type, data format, data size, or image resolution.

10. The method of claim 1, wherein the first ad content is replaced with the second ad content in the third area before the third area is displayed within the second area.

11. The method of claim 1, wherein the first ad content is replaced with the second ad content in the third area while the third area is displayed within the second area.

12. The method of claim 1, wherein the third area is scrolled into the second area via a touchscreen.

13. The method of claim 1, wherein the third area is scrolled into the second area via a cursor.

14. The method of claim 1, wherein the second ad content replaces the first ad content based on the second ad content being displayed over the first ad content.

15. The method of claim 1, wherein the second ad content replaces the first ad content based on the first ad content being removed from the third area and the second ad content being inserted into the third area.

16. The method of claim 1, wherein the first real-time determination, the second real-time determination, the second real-time ad bidding auction, and replacing of the first ad content in the third area with the second ad content is instructed by the script.

17. The method of claim 1, wherein the browser includes a just-in-time engine executing the script.

18. The method of claim 1, wherein the second real-time determination occurs during scrolling.

19. The method of claim 1, wherein the first ad content is displayed at least about 33% percent in pixels for a time period inclusively between at least about 1 second and about 65 seconds within the second area while the web page remains loaded in the browser prior to the requesting of the second real-time ad bidding auction for the second ad content.

20. The method of claim 19, wherein the first ad content is displayed at least 50% percent in pixels for the time period inclusively between at least about 1 second and about 65 seconds within the second area while the web page remains loaded in the browser prior to the requesting of the second real-time ad bidding auction for the second ad content.

21. The method of claim 20, wherein the first ad content is displayed at least about 75% percent in pixels for the time period inclusively between at least about 1 second and about 65 seconds within the second area while the web page remains loaded in the browser prior to the requesting of the second real-time ad bidding auction for the second ad content.

22. The method of claim 19, wherein the first ad content is fully displayed in pixels for the time period inclusively between at least about 1 second and about 65 seconds within the second area while the web page remains loaded in the browser prior to the requesting of the second real-time ad bidding auction for the second ad content.

23. The method of claim 1, wherein the first ad content is displayed at least 50% in pixels for a time period inclusively between at least about 6 seconds and about 65 seconds within the second area while the web page remains loaded in the browser prior to the requesting of the second real-time ad bidding auction for the second ad content.

24. The method of claim 1, further comprising:

causing, by the processor, a geolocation or a network location of the browser to be identified when the web page is at least one of requested, loading, or loaded;

causing, by the processor, the second real-time ad bidding auction for the second ad content to occur based on a shortest signal travel distance at that time or a quickest response time at that time based on the geolocation or the network location.

25. The method of claim 24, wherein the geolocation is based on the processor communicating with a satellite positioning receiver or a cell site.

26. The method of claim 24, wherein the network location is based on a network address of the browser.

27. The method of claim 24, wherein the second real-time ad bidding auction is a server-to-server auction having a server and a group of servers, wherein the processor is in communication with the server, where the server is in communication with the group of servers such that the server is logically interposed between the processor and the group of servers, wherein the server selects one member of the group of servers based on the shortest signal travel distance or the quickest response time based on the geolocation or the network location.

28. The method of claim 27, wherein the server selects the one member of the group of servers based on the shortest signal travel distance based on the geolocation or the network location.

29. The method of claim 27, wherein the server selects the one member of the group of servers based on the quickest response time based on the geolocation or the network location.

30. The method of claim 24, wherein the second real-time ad bidding auction is a client side auction having a client being in communication with a group of servers, wherein the client includes the processor, wherein the processor selects one member of the group of servers based on the shortest signal travel distance or the quickest response time based on the geolocation or the network location.

31. The method of claim 30, wherein the processor selects the one member of the group of servers based on the shortest signal travel distance based on the geolocation or the network location.

32. The method of claim 30, wherein the processor selects the one member of the group of servers based on the quickest response time based on the geolocation or the network location.

33. A memory storing a set of instructions executable by a processor to instruct the processor to:
  load a web page in a browser having a viewport, wherein the web page has a first area, wherein the viewport has a second area, wherein the first area is larger than the second area, wherein the web page has a script embedded therein, wherein the first area contains a third area, wherein the first area is larger than the third area, wherein the third area is not positioned within the second area when the web page is loaded, wherein the third area contains a first ad content sourced from a first real-time ad bidding auction;
  perform a first real-time determination whether the first ad content has been loaded in the web page for a predefined time period while the web page remains loaded in the browser, wherein the first real-time determination is via the script while the web page remains loaded in the browser;
  perform a second real-time determination whether the third area has been scrolled into the second area after at least one of as of or after the expiration of the predefined time period has expired while the web page remains loaded in the browser, wherein the second real-time determination is via the script while the web page remains loaded in the browser, wherein the second real-time determination is based on the first real-time determination determining that the first ad content has been loaded in the web page for the predefined time period while the web page remains loaded in the browser;
  request a second real-time ad bidding auction for a second ad content to be input into the third area and replace the first ad content responsive to the third area being scrolled into the second area based on the second real-time determination while the web page remains loaded in the browser, wherein the second real-time ad bidding auction occurs while the web page remains loaded in the browser;
  receive the second ad content sourced from the second real-time ad bidding auction while the web page remains loaded in the browser; and
  replace the first ad content in the third area with the second ad content responsive to the third area being scrolled into the second area while the web page remains loaded in the browser such that the second ad content is displayed within the second area while the web page remains loaded in the browser.

34. The memory of claim 33, wherein the browser includes a just-in-time engine, wherein the set of instructions is executable by the processor such that the just-in-time engine executes the script.

* * * * *